J. L. ROWLAND.
Treatment of Lime for the Manufacture of Artificial Stone.

No. 137,323.

Patented April 1, 1873.

UNITED STATES PATENT OFFICE.

JAMES L. ROWLAND, OF MILWAUKEE, WISCONSIN.

IMPROVEMENT IN THE TREATMENT OF LIME FOR THE MANUFACTURE OF ARTIFICIAL STONE.

Specification forming part of Letters Patent No. 137,323, dated April 1, 1873; appli ation filed November 26, 1872.

*To all whom it may concern:*

Be it known that I, JAMES L. ROWLAND, of Milwaukee, in the county of Milwaukee, and State of Wisconsin, have invented an Improvement in the Treatment of Lime for the Manufacture of Artificial Stone and other purposes; and I do hereby declare that the following is a full, clear, and exact description thereof, reference being had to the accompanying drawing making part of this specification, in which—

Figure 1:
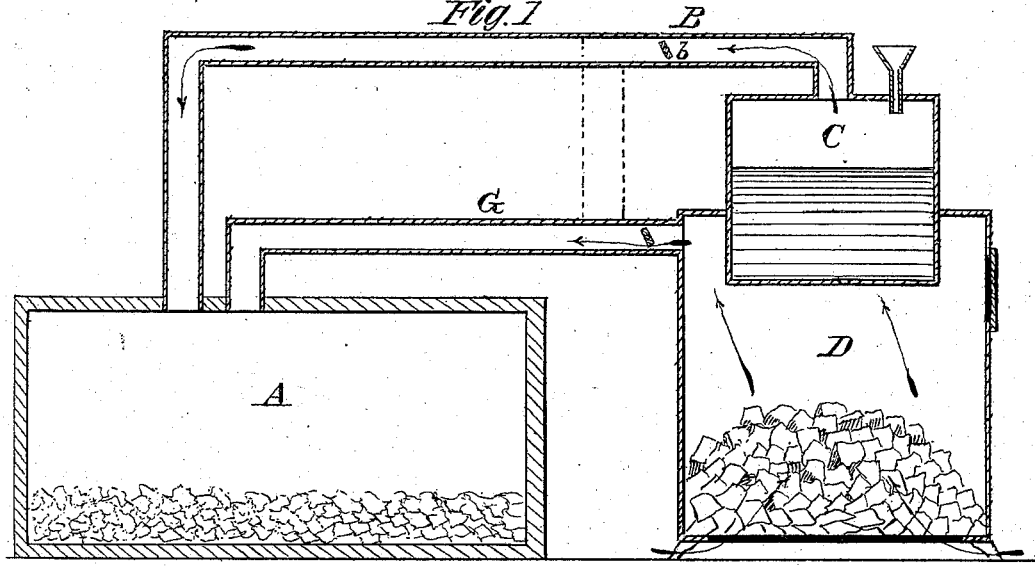
Figure 2:
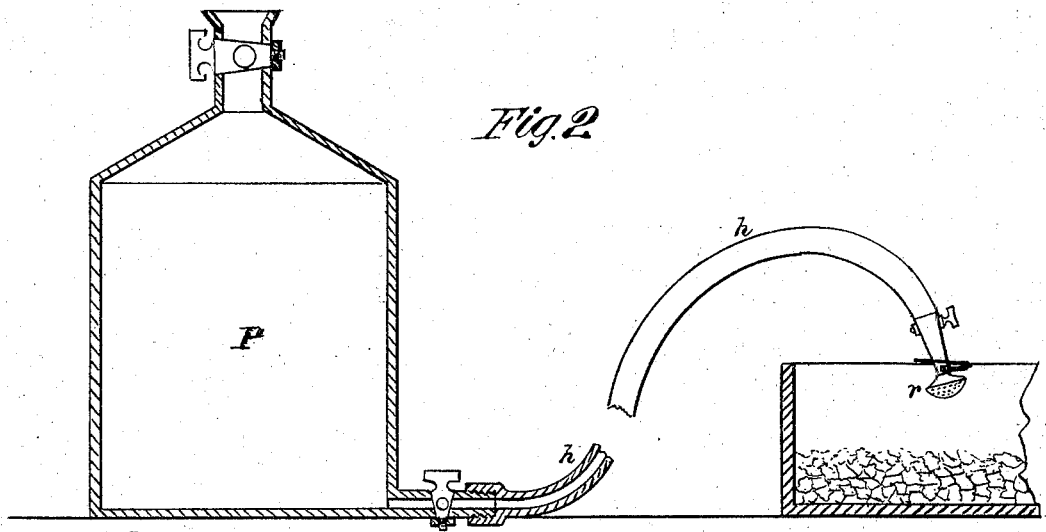

Figure 1 is a sectional view of my apparatus for treating lime with steam alone or with steam and carbonic-acid gas. Fig. 2 is a sectional view of the apparatus for throwing a fine spray of water charged with carbonic-acid gas upon lime.

My invention relates to the slaking of hydraulic or common or air lime, and the production of a hydrate or a hydrated subcarbonate of lime in the form of a powder with very finely-attenuated particles, or in a state or condition to be easily reduced to such a powder. It consists in the application of water in very finely-divided particles, as steam, mist, or vapor, or of carbonic acid or carbonic dioxide, together with or in combination with steam, vapor, or mist; or of water charged or saturated with carbonic acid or carbonic oxide, or holding it in solution, to the lime, in the process of slaking the same, and the production of a hydrate or subcarbonated hydrate. Of the various methods or modes that may be used or adopted in making this application, one is to place the lime in a chamber or apartment, A, of any suitable construction and convenience for the operation, and then to introduce therein steam or vapor, or carbonic acid or carbonic oxide, together with or in combination with steam or vapor.

No particular method or arrangement, therefore, of introducing into the chamber or apartment A the steam, mist, or vapor, either when used alone and without the gas, or when used together with or in combination with it, is requisite further than convenience and the admission therein of the steam, vapor or moisture, and a control of the quantities. A mode for the introduction therein of steam or vapor, used without the gas, is through a suitable pipe, B, or tube, leading from the boiler or generator C, in which the vapor or steam is produced, into the chamber or apartment A, and provided with or having fitted in it somewhere in its passage to the chamber or apartment a stop cock, *b*, or other arrangement, whereby regulated quantities may be admitted, and for the introduction therein of carbonic acid or carbonic oxide, together with or in combination with steam or vapor, and also for generating or producing the carbonic acid or carbonic oxide and steam or vapor required a simple mode or method is to manufacture the gas and also the steam or vapor at the same time and in the same operation by burning charcoal, coke, or anthracite coal, either separately or together, or one or more of these in combination with other carbonized or carbonated substances or materials, as marble or lime-rock broken into fragments or small pieces in a suitable grate or furnace, D, having a flue or pipe, G, leading into the chamber or apartment A, or connected to another flue or pipe leading into the same, for discharging the gas or allowing it to escape freely therein as produced, and also a covered pan or boiler suitably fitted or adjusted to it, (which is kept in proper supply of water) for generating steam or vapor, as shown in Fig. 1. This pan or boiler has also a tube or pipe running from it into the chamber or apartment for discharging steam or vapor therein, and has fitted in it, as above described, a stop-cock or valve by which, if desired, the steam or vapor may be admitted in regulated quantities; and if it be desired to have the steam or vapor and gas mix or diffuse previous to its entering the chamber or apartment, this may be effected by running the steam or vapor pipe into the gas pipe or flue somewhere in its passage from the grate or furnace to the chamber or apartment, as indicated in dotted lines, Fig. 1, or by running both the gas and steam pipes into a tight box or apartment of six or eight or more cubic feet capacity, in which the gas and vapor mix and diffuse, and connecting this box, apartment, or cylinder with a proper pipe directly with the chamber or apartment in which the lime is placed, for conducting the vapor and gas mixed and diffused into it; or, if properly-regulated quantities of water in the form of fine spray be discharged upon the burning material in the grate or furnace, the gas and vapor may, in this manner, be obtained, diffused, or in combination, and discharged through the gas pipe or flue into the chamber or apartment.

In an application of vapor or steam without the gas to the lime, I prefer to apply regulated quantities, such as the lime will readily take up or absorb, and not saturating the lime to such a degree that when a portion of it is taken out of the chamber or apartment and exposed to the open air a short time it will not exhibit a dry appearance, and continue the application until the lime is in a perfectly slaked condition.

So, in an application of steam, mist, or vapors together with or in combination with carbonic acid or carbonic oxide to the lime, I prefer to use no greater quantities of steam, vapor, or moisture together with or in combination with the gas than the lime may absorb and still exhibit a dry appearance, as above described, when a portion of it is taken out of the chamber or apartment and exposed to the open air. But the carbonic gas may be used or applied in such quantities as the lime may absorb, or in any excess of those quantities.

This application to the lime of carbonic acid or carbonic oxide, together with or in combination with steam, vapor, or moisture, is continued until the lime, in consequence of the chemical change effected thereby, has assumed a broken, fragmentary, and fleecy appearance, much expanded in bulk, and in a state or condition so charged that lumps or any portion of the mass can be easily crushed between the thumb and fingers into a fine impalpable powder without any perceptible gritty parts.

An application to the lime of water charged or saturated with the gas may be made by suitably attaching to the cylinder, vessel, or reservoir P, charged with the gas and water, a small hose, $h$, (one-half inch or more in diameter,) of convenient length, having a rose, $r$, pierced with fine holes affixed to a nozzle provided with a stop-cock. In this manner regulated quantities of the charge, in the form of fine spray, may be applied, and an excess of water avoided in the process of slaking. If the pressure-force of the charge is insufficient to discharge it as desired, the cylinder or reservoir may be elevated to get force.

In this latter application I prefer to have the lime in a thin layer of a foot or eighteen inches or thereabout in thickness, and after each application to confine the steam or heat generated in the process of slaking by placing a close cover over the box, or closing the opening to the apartment containing the lime.

Some of the many advantages and merits which these products (either the hydrate or subcarbonated hydrate) possess over a hydrate of lime obtained in the usual mode by air or water slaking are: First, they are free from gritty and unslaked portions or particles; and therefore, however or for whatever purposes used, no after slaking occurs, the injurious results of which are well known. Second, they are reduced with greatest facility to a powdered state or condition of exceedingly finely-attenuated particles or atoms, which state or condition, on account of the exceeding attenuity or fineness of its particles, is the best and fittest that lime for the manufacture of artificial stone, mortars, concretes, paints, and coatings, and its application to many other purposes is susceptible of taking. Third, they are quicker and harder setting, and make stronger mortars and concretes, and stronger and more perfect artificial stone.

It is known to masons and builders that a mortar prepared or made in the usual way, if worked over occasionally and suffered to get age, becomes greatly more efficient, setting quicker, and harder than if used when fresh and first made. This is due to the fact that by the working over of the mortar and allowing it to get age, as it is termed, the lime in it gets rid of a portion of the excess of water that was used in slaking it, becomes more thoroughly slaked, and by absorbing carbonic acid or carbonic oxide from the air, becomes, to a certain extent, subcarbonated.

This improvement thus secured in the qualities of a lime in a mortar, the above-described products have in consequence of the treatment of the lime in their production with no excess of water, and the lime is perfectly slaked; and what is termed chilling the lime, and the formation of gritty portions, (the result of the use of an excess of and repeated applications of water,) are avoided, as in the application of steam or vapor, the water being applied in finely-divided particles, no excess of it is used, only comparatively small quantities being required to slake it.

So too in the case of the application of carbonic acid or carbonic oxide, and water or moisture, a thorough and efficient slaking is effected with comparatively small quantities of water.

What I claim as new, and desire to secure by Letters Patent, is—

1. As a means of slaking a lime or hydraulic or common or air lime, and producing a hydrate, the application to the lime of water in very finely-divided particles, as steam or vapors, substantially as set forth.

2. As a means of slaking a hydraulic or common or air lime, and producing a hydrate or subcarbonate hydrate, the application to the lime of carbonic acid, together with or in combination with water, either in its natural state or in any of the forms it is susceptible of taking that are practicable in this process, as steam, vapor, mist, or spray, substantially as set forth.

3. As a means of slaking a hydraulic or common or air lime, and producing a hydrate or subcarbonated hydrate, the application to the lime of water charged or saturated with carbonic acid or holding it in solution, substantially as set forth.

JAMES L. ROWLAND.

Witnesses:
J. N. CAMPBELL,
JAMES MARTIN, Jr.